Sept. 17, 1929.  P. PASZKOWSKI  1,728,507
BEARING
Filed Jan. 22, 1925
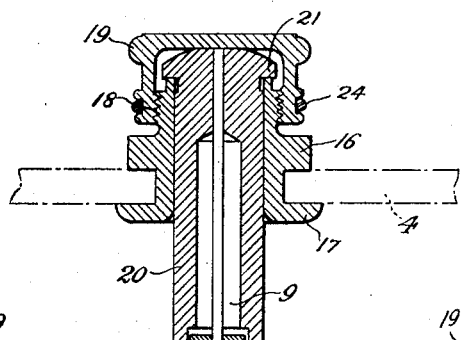
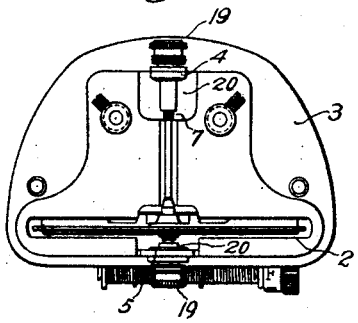
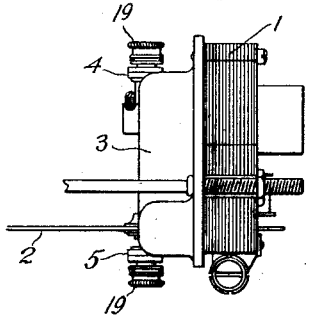
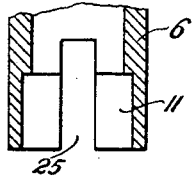
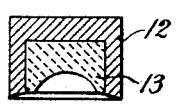
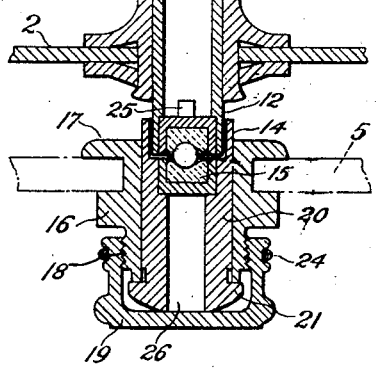
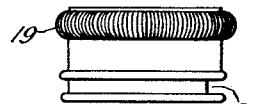
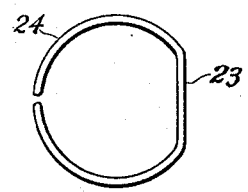
WITNESSES:
INVENTOR
Paul Paszkowski
BY
ATTORNEY Patented Sept. 17, 1929

1,728,507

UNITED STATES PATENT OFFICE

PAUL PASZKOWSKI, OF IRVINGTON, NEW JERSEY, ASSIGNOR TO WESTINGHOUSE ELECTRIC & MANUFACTURING COMPANY, A CORPORATION OF PENNSYLVANIA

BEARING

Application filed January 22, 1925. Serial No. 4,027.

My invention relates to bearings and more particularly to bearings for the movable elements of electrical measuring instruments.

The object of my invention is to provide an improved jewel bearing that may be readily dismantled to permit adjustment and removal of the movable element of the meter and in which the jewel mountings may be readily replaced in case they become worn or injured.

In accordance with my invention, the vertical shaft of a watthour meter or the like is mounted upon vertical bearing sleeves in upper and lower bushings on the frame of the instrument. The bearing sleeves may be removed vertically from the bushings to thus permit the shaft to be removed. The lower bearing comprises a jewel permanently mounted in a jewel-cup, the end of the shaft being recessed to receive the jewel-cup and slotted to facilitate the removal of the jewel by a suitable tool in case it becomes damaged.

My invention may be clearly understood upon reference to the accompanying drawings, in which Figs 1 and 2 are front and side views, respectively, of the electromagnet and moving element of a watthour meter embodying my invention;

Fig. 3 is a longitudinal sectional view, to an enlarged scale, of the shaft and bearings shown in Figs. 1 and 2;

Figs. 4 and 5 are detail views, to an enlarged scale, of the lower end of the shaft and the jewel-cup therefor;

Fig. 6 is a detail view of the threaded cap or thumb nut for securing the bearing sleeves in position, and Fig. 7 is a detail view of the locking spring used in connection with the thumb nut shown in Fig. 6.

Referring to Figs. 1 and 2, the watthour meter shown comprises an electromagnet 1 having a pivoted armature member 2 actuated thereby in accordance with the degree of energization of the electromagnet. The armature 2 is pivoted upon a pressed steel frame 3 that is secured to the electromagnet, the frame having integral lugs 4 and 5 for that purpose. The armature 2 is a flat disc and it is clamped to a vertical shaft 6. The shaft 6 is provided with a toothed pinion 7 for driving the usual register (not shown), and an upper bearing 8 of phosphor-bronze or the like that is adapted to cooperate with the steel rod 9 is supported by the upper frame lug 4.

The shaft 6 has an expanded lower portion 10 that is recessed at 11 to receive a jewel-cup 12 (see Figs. 4 and 5). The jewel-cup 12 contains a jewel 13 that is adapted to cooperate with a hardened and polished steel ball 14 resting upon a lower jewel 15 which is supported by the lower lug 5 on the frame. Each of the lugs 4 and 5 is provided with a perforated bushing 16 that is spun over at its end 17 to secure the same to the lug. The bushings 16 are threaded at 18 to receive a threaded cap or thumb nut 19. A sleeve member 20 carrying the elements of the bearing is positioned inside of the bushing 16 and is provided with a shoulder 21 abutting the end of said bushing to position the sleeve member and bearing elements accurately in a vertical direction.

To remove the bearings and the shaft 6 from the frame, it is only necessary to unscrew the threaded caps 19, lift the upper sleeve member 20 out of the cooperating bushing 16 and drop the corresponding lower sleeve member 20 out of engagement with the lower bushing 16. It is, of course, essential that the shaft 6 and the disc 2 be positioned accurately in both vertical and horizontal directions in order that the disc may be held in proper relation to the electromagnet 1.

This result is accomplished by reaming out the holes through the bushings 16 in a definite relation to the frame 3 and electromagnet 1 after the bushings have been secured to the frame and by cutting off the upper and lower ends of the upper and lower bushings 16 respectively in order to provide exactly the desired distances between the disc 2 and these surfaces. Then, if the bearing elements upon the shaft 6 are accurately positioned with respect to the disc 2, and the sleeve members 20 with their bearing elements 9 and 15 are of uniform length, no individual adjustments will be required and the bearing elements in all instruments will be interchangeable.

In assembling an instrument, the sleeve members 20 are inserted in the upper and lower bushings 16 and the threaded caps 19 screwed up tight, thereby securing the sleeve members in the position determined by the shoulder 21 upon each sleeve member. In order to prevent the threaded caps 19 from becoming loose, they are slotted, as indicated at 22, (see Fig. 6) to receive the straight portion 23 of a locking spring 24. The slot 22 is cut deep enough to allow the portion 23 of the spring 24 to directly engage the threads 18 in the bushings 16 and lock the cap 19 in place.

Although the jewels used in the lower bearings are carefully inspected before being mounted, one of the jewels is occasionally damaged in the construction of the instrument. Furthermore, a jewel is sometimes damaged in service on account of the introduction of dirt or other abrasive material between the jewel and the ball-bearing 14. In order to facilitate the replacement of the defective jewel, the jewels are mounted in small cups, as shown in Fig. 5, and the ends of the shaft 6 and of the lower sleeve member 20 are recessed to receive the jewel-cup, the cup being a pressed fit with the recess. The lower end of the shaft 6 is also slotted, as indicated at 25, to permit the introduction of a suitable tool to force the jewel-cup containing the defective jewel out of the shaft. A new cup is then inserted in the recess and is pressed into place. The lower sleeve member 20 is drilled, as shown at 26, to facilitate the removal of the lower jewel 15 by means of a suitable punch or other tool inserted therein.

My invention is not limited to the precise form shown and described and, therefore, I do not wish it to be limited in scope except as indicated in the appended claims.

I claim as my invention:

1. In combination a supporting member, a non-resilient sleeve member loosely engaging said supporting member, a bearing on said sleeve member, a threaded cap for securing said sleeve member in place, and frictional means for locking said cap.

2. In combination, a supporting member, a non-resilient sleeve member slidably engaging said supporting member, a bearing on said sleeve member, a threaded cap for securing said sleeve member in place, and frictional means for locking said cap.

3. In combination, a supporting bushing, a sleeve slidably engaging the inner surface of said bushing, said sleeve having a shoulder abutting one end of said bushing, a bearing associated with said sleeve, means cooperating with said bushing for retaining said sleeve in position, and means for locking said retaining means in place.

In testimony whereof, I have hereunto subscribed my name this 18 day of December, 1924.

PAUL PASZKOWSKI.